United States Patent Office 2,897,210
Patented July 28, 1959

2,897,210

PHTHALIDYL ESTERS OF ALKANOIC ACIDS

Donald D. Wheeler and David C. Young, Midland, Mich., assignors to The Dow Chemical Company, Midland, Mich., a corporation of Delaware No Drawing. Application August 3, 1956
Serial No. 602,069

3 Claims. (Cl. 260—343.3)

This invention is concerned with phthalidyl esters of alkanoic acids having the formula

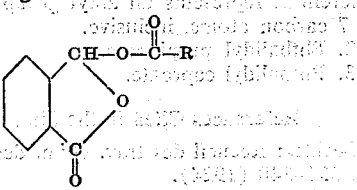

wherein R is a lower alkyl group containing from 2 to 7 carbon atoms, inclusive. The products of this invention are generally light colored liquids or low-melting solids somewhat soluble in organic solvents such as acetone, ethanol and benzene and substantially insoluble in water. The new compounds are useful as antimicrobials adapted to be employed as toxicants in germicidal preparations.

The above compounds may be prepared by causing phthalaldehydic to react with a suitable aliphatic acid anhydride to produce the desired phthalidyl ester of an alkanoic acid and an acid by-product. Suitable aliphatic acid anhydrides are those derived from alkanoic acids containing from 1 to 8 carbon atoms, inclusive. The term "phthalidyl" refers to the radical

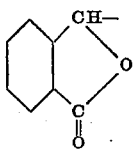

obtained by removing the hydroxyl group from the structure of phthalaldehydic acid. The terms "phthalaldehydic acid" and "3-hydroxyphthalide" refer to a compound having the structure

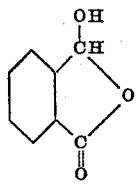

Phthalaldehydic acid is often represented in the literature as having the structure

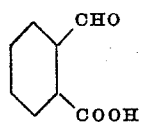

However, the acid employed in this invention and prepared as hereinafter described exists almost entirely in the 3-hydroxyphthalide ring structure, as indicated by a study of its infrared absorption spectrum. Infrared data also indicate the phthalide products to have the ring structure.

In the synthesis, good results are obtained when substantially equimolar proportions of the reactants are employed. The reaction takes place smoothly in the temperature range of from 90° to 200° C. Solvents such as benzene and toluene may be employed as reaction medium, if desired.

In carrying out the reaction, phthalaldehydic acid and the appropriate acid anhydride are mixed together and heated to the reaction temperature. If desired, the pressure in the reaction zone may be reduced to about 150 millimeters. The heating is carried out over a period of from 1 to 3 hours. During the heating a reaction takes place with the formation of the desired phthalidyl ester product and an alkanoic acid by-product which is allowed to distill from the reaction mixture. The crude product is recovered as residue. After completion of the heating, the residue is poured into water to precipitate a phthalidyl alkanoate product. The precipitated product, if a solid, is recovered by filtration. It may be purified, if desired, by washing or recrystallization. The product, if a liquid, is extracted with benzene and the benzene extract washed with water and then distilled to remove the solvent and to recover the desired product.

The following examples illustrate the invention but are not to be construed as limiting.

Example 1.—Phthalidyl propionate 75.0 grams (0.5 mole) of phthalaldehydic acid and 78.0 grams (0.6 mole) of propionic anhydride were mixed together and heated to 160°–170° C. for 2 hours to produce the desired phthalidyl propionate and propionic acid by-product. The latter was allowed to distill slowly from the reaction zone. The reaction mixture was then cooled to 80° C. and poured with stirring into 800 milliliters of water whereupon a solid precipitated. The solid was filtered, washed with water and dried to obtain a phthalidyl propionate product melting at 72°–74° C.

Example 2.—Phthalidyl caproate 75.0 grams (0.35 mole) of caproic anhydride and 52.5 grams (0.35 mole) of phthalaldehydic acid were mixed together and heated to 150°–180° C. while the pressure was reduced to 100 millimeters. The heating was carried out over a period of 1.5 hours while the caproic acid was allowed to distill slowly from the reaction zone. The reaction mixture was then cooled to 80° C. and poured into 800 milliliters of water whereupon an oil precipitated and solidified when the mixture was stirred. The solid was collected by filtration and dried to obtain a phthalidyl caproate product melting at 44°–47° C. The yield of the product amounted to 83 grams or 96 percent of theoretical.

Example 3.—Phthalidyl isobutyrate 75.0 grams (0.5 mole) of phthalaldehydic acid and 94.8 grams (0.6 mole) of isobutyric anhydride are mixed together and heated to 160°–170° C. for 2 hours to produce the desired phthalidyl isobutyrate and isobutyric acid by-product. The latter is allowed to distill slowly from the reaction zone. The reaction mixture is then cooled to about 80° C. and thereafter poured with stirring into 800 milliliters of water to precipitate a solid phthalidyl isobutyrate product. The latter is recovered by filtration, washed with water and dried to obtain a low melting crystalline product having a molecular weight of 220.

Example 4.—Phthalidyl isovalerate 75.0 grams (0.5 mole) of phthalaldehydic acid and 93.1 grams (0.5 mole) of isovaleric anhydride are mixed together and heated to 150°–180° C. while the pressure is reduced to 100 millimeters. The heating is carried out over a period of 2 hours while the isovaleric acid is allowed to distill from the reaction zone. The resulting mixture is then cooled and poured into 800 milliliters of water to precipitate a phthalidyl isovalerate product. The latter is extracted therefrom with benzene, the benzene extract washed with water and the solvent distilled to obtain as residue a purified product having a molecular weight of 234.

In preparations carried out in a similar manner, the following phthalidyl alkanoates are prepared:

Phthalidyl trimethylacetate having a molecular weight of 234 by the reaction of phthalaldehydic acid with trimethylacetic anhydride.

Phthalidyl normal-butyrate having a molecular weight of 220 by the reaction of phthalaldehydic acid with normal-butyric anhydride.

Phthalidyl normal-valerate having a molecular weight of 234 by the reaction of phthalaldehydic acid with normal-valeric anhydride.

Phthalidyl normal-caprylate having a molecular weight of 262 by the reaction of phthalaldehydic acid with normal-caprylic anhydride.

The products of the present invention are useful as parasiticides adapted to be employed for the control of bacterial and fungal organisms. In a representative operation, phthalidyl propionate was added to bacteriological media to give a concentration of 0.05 percent and the media inoculated with *Staphlococcus aureus* and *Aspergillus terreus* and incubated at 30° C. for four days. At the end of this period, complete inhibition of growth of the test organism was observed.

The phthalaldehydic acid employed in this invention may be prepared by first photochlorinating o-xylene to obtain $\alpha,\alpha,\alpha',\alpha'$-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U.S. Patent 2,748,162.

We claim:

1. A phthalidyl ester of a lower aliphatic acid having the structure

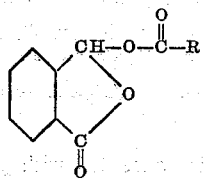

wherein R represents an alkyl group containing from 2 to 7 carbon atoms, inclusive.

2. Phthalidyl propionate.
3. Phthalidyl caproate.

References Cited in the file of this patent

Seekles: Recueil des trav. chim. des Pays-Bas, vol. 43, pp. 331–340 (1924).

Racine: Justus Leibig's Annalen der chemie, vol. 239, pp. 78–91.

Mowry et al.: J. Am. Chem. Soc., 71, pp. 120–122 (1949).